Dec. 12, 1961   O. JENKINS   3,012,743
MOTOR MOUNTING RING
Filed Oct. 5, 1959

INVENTOR
Orville Jenkins
BY
ATTORNEYS

United States Patent Office 3,012,743
Patented Dec. 12, 1961

3,012,743
MOTOR MOUNTING RING
Orville Jenkins, P.O. Box 36, Ironton, Ohio
Filed Oct. 5, 1959, Ser. No. 844,531
7 Claims. (Cl. 248—26)

This invention relates to resilient mountings for machinery, and more particularly, to a resilient mounting for rotary dynamo electric machinery such as motors and the like.

In mounting dynamo electric machinery such as motors, it is commonly the practice to provide a ring of resilient material concentrically between hub extensions on the motor end frames and the motor support, so that vibrations developing in either the support or the motor are insulated from each other. An example of such a mounting is disclosed in U.S. Patent No. 2,074,136 to Welch. While in general, such devices have been highly satisfactory for the purpose intended, certain disadvantages have arisen in the use of structures heretofore available. For example, in most of the motor mounting arrangements of this type available in the past, the assembly entailed a somewhat cumbersome clamping arrangement for securing the assembled motor hub and resilient ring in place on the motor supporting structure. This, of course, requires considerable time either to mount or dismount the motor on its support. Also, the problem of satisfactorily mounting a motor or the like in this manner, and while at the same time providing suitable means for opposing the drive torque reaction developed in the motor frame hubs without critically modifying the hub structure, have gone substantially unsolved. Moreover, there is a need for an inexpensive motor mounting arrangement of the type incorporating an annulus of resilient material which is economical to manufacture, and as well, adaptable to existing motor frame end structures.

Accordingly, an object of this invention is to provide a rotary machinery mounting of the type incorporating an annulus of resilient material and by which the problems and disadvantages previously encountered are effectively overcome.

Another object of this invention is the provision of a motor mounting ring which is quickly engageable or disengageable with a motor frame hub without requiring the use of special tools or the like.

A further object of this invention is to provide a motor mounting ring of the type referred to, which is also quickly and easily inserted or removed from a motor supporting structure.

A further object of this invention is the provision in a motor mounting arrangement of the type referred to of an exceedingly simple and yet highly effective means for absorbing the reaction to torque developed by the motor or the like.

Still another object of this invention is the provision of a motor mounting ring of the type referred to, which may be adaptable to existing motor frame hub structures, without extensive modification thereof.

These and other objects will be apparent from the following detailed description read in conjunction with the attached sheets of drawing, in which.

In general, the aforementioned objects are achieved by mounting the motor end frame or other machinery hubs in apertures in end walls of a supporting base structure through the provision of a resilient mounting ring. The mounting ring is formed having a central annulus of resilient material bonded or otherwise secured to inner and outer metallic rings. The inner metallic ring is formed having a plurality of axially extending fingers, the ends of which are engageable in radial slots machined or otherwise formed in the exterior of the hub, while the outer metallic ring is formed having a radial recess on its periphery and is suitably gapped to facilitate its insertion into a closed, generally circular aperture. Further, the end supporting base end wall apertures are slit at at least one point and portions on either side thereof bent out of alignment with each other to form tangs engageable with the gap in the outer metallic ring to prevent rotation of the ring and of the hub in the supporting member.

Figure 3:
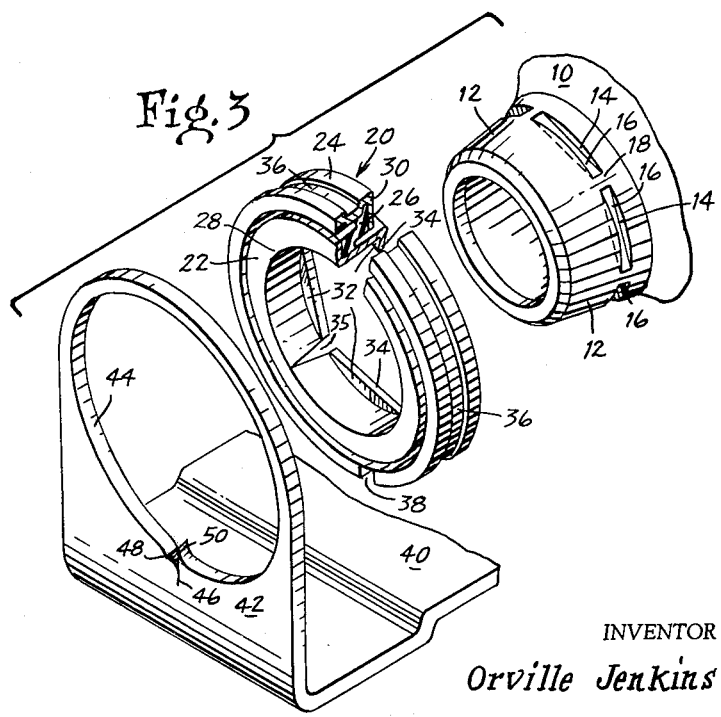
FIG. 3 is an exploded perspective view showing the respective motor mounting elements of this invention.

Referring now to the drawings, a motor end frame is shown designated generally by the numeral 10 and having an axially projecting hub 12. Since both ends of the motor frame are identical, only one end and mounting thereof is shown. Preferably, the hub 12 is provided with a generally frusto-conical exterior surface, although it will be understood by those familiar in this art that the hub may assume any generally circular shape wherein the diameter of the outer end is somewhat smaller than the diameter of the hub at the point where it merges with the motor end frame. As shown most clearly in FIG. 3, a plurality of radially extending recesses or grooves 14 are machined, cast or otherwise formed in the hub 12, the bottoms 16 of which lie along chords which intersect the hub periphery at points spaced thereabout in a manner such that portions 18 of the hub surface extend between each of the recesses 14. The bottoms 16 of the recesses thus define cam surfaces which generate an outward radial component of force upon rotation of the hub 12.

The mounting ring by which resilient support of the motor or other machinery is effected is designated generally by the numeral 20 in the drawings and is formed having an inner metallic ring 22, an outer metallic ring 24, and a central annulus 26 of any suitable resilient material such as rubber or the like. For purposes of this description, the rings 22 and 24 are designated as "metallic" though it is to be understood that other materials having similar qualities could be used such as for example, plastics, fibrous material and the like. Preferably, both the inner and outer metallic rings 22 and 24, respectively, are provided with radial flange portions 28 and 30 to increase the bonding area presented to the resilient annulus 26, and yet be sufficiently spaced to completely insulate any vibration passing between the inner and outer rings.

The inner ring is provided with a plurality of axially extending fingers 32 having radially inwardly directed tips 34 on the free ends thereof. The fingers 32 are formed by severing an initially cylindrical portion of the inner ring 32 to form slits 35 between each of the fingers. Thus, it will be understood that the fingers 32, though resilient and capable of outward deflection, will tend to lie in the cylinder from which they are formed. The edges of the inwardly turned ends 34 of the fingers 32 are formed to lie on chords and thus complement the configuration of the recesses 14 in the hub 12. Thus, it becomes apparent that the rotation of the hub 12 in the ring 22 is prevented to the extent necessary under normal torque loads transmitted from the motor by the inward bias of finger ends 34 in the recesses 14. Further, it will be noted that such characteristics as stiffness of the metal or other material from which the ring 22 is made, the depth of the recesses 14 as well as the number thereof will vary the amount of torque reaction possible without rotation of the hub with respect to the ring 20.

The outer ring 24 as aforementioned is formed having a radial flange 30 and further is provided with a circumferential groove 36 in its exterior surface. Also, a portion of the outer ring is cut out to provide a gap 38 therein. Because of the gap 38 and since the ring 24 is bonded to the resilient annulus 26, it will be apparent that a slight degree of radial compressibility or resiliency is afforded in the outer ring 24.

The motor mounting or supporting structure is preferably in the form of an integral U-shaped member having a base 40 which may be bolted, welded or otherwise affixed to any stable structure and a pair of upstanding end walls 42 (only one is shown). Each of the end walls is provided with a generally circular aperture 44 of a diameter substantially equal to the external diameter of the circumferential groove 36 in the outer metallic ring 24 of the mounting ring 20. Further, the end wall 42 is slit at the aperture 44, as designated by the numeral 46 in the drawings. The material from which the end walls are formed is then bent outwardly in opposite directions on each side of the slit to form laterally offset tangs 48 and 50. The lateral distance between the points of the tangs 48 and 50 is greater than the width of the groove 36 in the outer metallic ring 24, so that when the gap 38 in the outer ring is positioned thereover, the tangs 48 and 50 are engageable with opposite edges of the gap 38 on either side of the groove 36 to prevent rotation of the ring 24 with respect to the end wall 42.

In use, assuming that the motor frame hub 12 has been provided with properly formed recesses 14 therein, the ring 20 is inserted onto the hub by merely pressing it axially thereover until the ends 34 on the resilient fingers 32 snap into and firmly engage the recesses 14. Having thus assembled the mounting ring 20 on the hub 12, the outer metallic ring 24 of the mounting ring 20 is compressed slightly and snapped into the aperture 44 of the end wall 42 of the mounting or support structure. As aforementioned, this ring is assembled in the aperture 44 such that the gap 38 therein is positioned adjacent the slit 46 and tangs 48 and 50 so that rotation of the ring is prevented. Also, because of the groove 36 in the outer metallic ring, axial movement thereof with respect to the wall 42 is prevented.

Thus, it will be seen that the motor end frame 10 is securely retained within the end wall aperture 44 without requiring any special tools, and without the manipulation of any cumbersome clamping devices. As mentioned above, the inward force urging the finger ends 34 into the recesses and other controlling characteristics of this engagement prevents rotation of the hub 12 in the metallic ring 22. Since the outer metallic ring 24 is likewise retained against rotation, and since both rings are bonded or otherwise secured to the rubber annulus 26, torsional vibrations in either the support or the supported machine will develop shearing stresses in the annulus 26 and be absorbed thereby.

To disassemble the hub 12, ring 20 and support 40, the outer metallic ring 24 is again compressed and snapped out of the aperture 44, leaving the ring 20 still in place on the hub 12. The ring 20 is then removed from the hub by applying a torque in excess of the normal operating torque mentioned previously. Upon the application of such a torque, the finger ends 34 are cammed outwardly and ride up on hub portion 18. When in this position, they are free of the recesses 14 and will easily slide axially from the hub.

Figure 1:
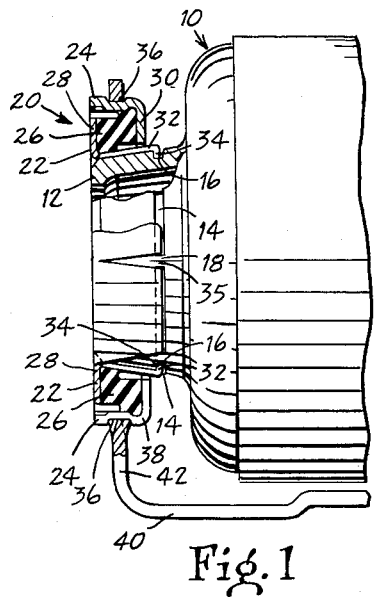
FIG. 1 is a fragmentary side elevation in partial cross-section, showing a motor end frame and hub supported by the mounting structure of this invention.
Figure 2:
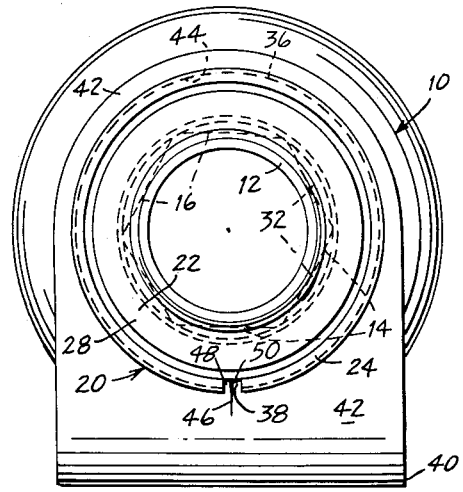
FIG. 2 is an end view of the assembly illustrated in FIG. 1.
Figure 4:
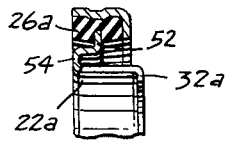
FIG. 4 is a fragmentary cross sectional view of a modified form of the motor mounting ring of this invention.

A modified embodiment of this invention is shown in FIG. 4, and while the structural details of this embodiment differ somewhat from the mounting ring 20 as described above, the operating characteristics are substantially the same. Using an "a" suffix with reference numerals correspondnig to the components of the principal embodiment, the main difference of this embodiment is in the inner ring 22a and its attachment to the resilient annulus 26a. In this instance, the inner ring is formed having a radial portion 52 embedded in the rubber annulus 26a, so that the fingers 32a are cantilevered from a doubled back portion 54. By this construction, the resiliency in the fingers 32a or resistance to the radial outward movement thereof is substantially all from the metallic ring inner structure per se, and not as much from the resilient annular member 26a as the principal embodiment. Thus, this modified form of the invention is especially suitable where larger operating torques are involved, primarily since the fingers 32a may be arranged to exert a stronger inwardly directed force against the bottoms of the recesses 14 in the hub 12.

In view of the foregoing description, it becomes apparent that by this invention there is provided an exceedingly simple, resilient, vibration absorbing mounting for a motor or like machinery. The construction of the mounting ring 20 with inner and outer metallic rings which may be snapped onto the hub 12 and as well, into the end wall aperture 44, without the use of any special tools, permits quick assembly and disassembly of the ring to the motor and of the motor to its mounting structure. Further, the provision of the slit 46 in the end wall 42, such that a pair of tangs 48 and 50 are provided for engaging the gap 38 in the outer ring 24, effects a highly efficient and yet simple and economical means for preventing rotation of the mounting ring with respect to the base 40. It will be understood that the recesses 14 in the hub 12 may be formed initially therein, such as by casting, or may be machined into the hub after it is formed. Also, while it is desirable to have the hub tapered as aforementioned, any pre-existing motor hub wherein the external diameter thereof increases toward its point of merger with the motor end frame, and having a sufficient axial extent to permit the machining of the recesses 14 therein, can be easily adapted to this particular mounting structure.

Since many possible changes can be made in this invention, and since many changes may be made in the embodiments hereinbefore set forth, without departing from the spirit of this invention, it is to be distinctly understood that the foregoing describes preferred embodiments, and that the invention is entitled to a full range of equivalents within the scope of the appended claims.

I claim:

1. A torque resisting resilient mounting for a machine comprising: a supporting wall having an aperture therethrough; a hub having a plurality of separate recesses spaced about its periphery, the bottoms of said recesses defining cam surfaces for generating an outward radial component of force upon rotation of said hub; and a resilient mounting ring for securing said hub in said aperture, said mounting ring including an inner ring, an outer ring and an annulus of resilient material concentrically between said inner and outer rings, said outer ring being fixedly secured in said wall aperture and said inner ring including radially biased resilient fingers having radially disposed end portions receivable in said hub recesses and engageable with said cam surfaces, said fingers and said cam surfaces being operable to resist torque loads developed by the machine, and said cam surfaces being operable to force said end portions outwardly of said recesses upon the application of torque to said hub in excess of that developed by the machine.

2. An apparatus for supporting a motor or the like comprising: a mounting base; a pair of upstanding end walls on said base, each of said walls having a generally circular aperture therethrough; a pair of hubs extending from opposite ends of the motor, said hubs having an exterior surface of generally circular cross-section, the diameter of which decreases toward the hub outer ends, said hubs also having a plurality of radial grooves in the exterior surfaces thereof, the bottoms of said grooves defining chords spaced intermittently about said hub cross section; and means for securing said hubs in said end wall apertures, said means including an outer ring resiliently received in said apertures, an annulus of resilient material bonded to the interior of said outer ring, and an inner ring bonded to the interior of said annulus, said inner ring having a plurality of axially extended resilient fingers having radially inwardly directed tips, said tips being receivable in said grooves and shaped to complement the bottom of said grooves.

3. A torque resisting resilient mounting for a machine comprising: a generally circular hub projecting from the machine, said hub having a plurality of separate recesses spaced about its circumference, the bottoms of said recesses defining cam surfaces for generating an outward radial component of force upon rotation of said hub; an annulus of resilient material; a ring fixed interiorly of said annulus, said ring including radially biased resilient fingers having radially disposed tips receivable in said hub recesses and engageable with said cam surfaces, said fingers and said cam surfaces being operable to resist torque loads developed by the machine, and said cam surfaces being operable to force said tips outwardly of said recesses upon the application of torque to said hub in excess of that developed by the machine; and means for fixedly supporting said annulus.

4. The mounting apparatus recited in claim 1 in which said outer ring is formed having a gap and a circumferential groove in its exterior surface engageable in said wall aperture and wherein the edge of said wall aperture is formed having laterally offset tangs to engage said gap.

5. The mounting apparatus recited in claim 1 in which the configuration of said hub is generally frusto-conical.

6. The mounting apparatus recited in claim 1 in which said inner and outer rings are formed having radial flanges and wherein said annulus is bonded to said inner and outer rings.

7. The mounting apparatus recited in claim 1 in which said inner ring is formed having a radially extending portion engageable with said annulus and a doubled back portion from which said fingers extend.

References Cited in the file of this patent
UNITED STATES PATENTS

| | | |
|---|---|---|
| 1,557,099 | Schulze | Oct. 13, 1925 |
| 2,349,215 | Wahlborg | May 16, 1944 |

FOREIGN PATENTS

| | | |
|---|---|---|
| 659,562 | Great Britain | Oct. 24, 1951 |